United States Patent Office 3,208,967
Patented Sept. 28, 1965

3,208,967
USE OF SUBSTITUTED PHENYLENEDIAMINE-ALKYL HALIDE CONDENSATION PRODUCTS OF ANTIOZONE AGENTS IN RUBBER
Harry E. Albert, Lafayette Hill, Pa., assignor to The Firestone Tire & Rubber Company, Akron, Ohio, a corporation of Ohio
No Drawing. Original application Nov. 23, 1960, Ser. No. 71,148. Divided and this application Feb. 24, 1964, Ser. No. 364,346
10 Claims. (Cl. 260—45.9)

This application is a division of my application Serial No. 71,148, filed November 23, 1960, which latter application was a continuation-in-part of my applications Serial No. 471,898 filed November 29, 1954, and Serial No. 681,873, filed August 27, 1957, both of which last-named applications are abandoned.

This invention relates to the use of new chemical compounds in inhibiting the deteriorating action of ozone on rubber compositions such as those containing natural rubber, a synthetic rubber homopolymer of butadiene or isoprene or other alkyl derivative thereof, or a copolymer of butadiene or an alkyl derivative thereof with another such diene or a vinyl copolymer, or a mixture of any of these rubbers. Such rubbers are widely used in tires, inner tubes, rubber thread, and products produced from rubber latexes and other rubber articles.

The deterioration of rubber is due to various factors and is evidenced in various ways. The inhibitors of this invention have been found to absorb or destroy ozone, and thus inhibit its deteriorating action on rubber. These antiozone agents are condensation products of (1) a disubstituted o- or p-phenylenediamine and (2) a dihalogenated reactant of the class consisting of dihalo alkanes and alkenes containing 2 to 12 carbon atoms, dihalocycloalkanes and dihalocycloalkenes containing 5 to 10 carbon atoms, and phenyl-, alkylphenyl-, chlorophenyl- and dichlorophenyl-substituted dihalo alkanes and alkenes containing 8 to 12 carbon atoms. The reactive halogen substitutents are on different carbon atoms and may be chlorine or bromine or iodine.

The dihalogenated reactants link the phenylenediamines through the nitrogen atoms. The phenylenediamine molecules each contain two replaceable hydrogens and the dihalogenated reactants can combine two or three or four or five or more of these molecules into a single compound. In the condensation products there is no hydrogen on the internal nitrogens.

Assuming the dihalogenated reactant to have the formula Hal.X.Hal, in the condensation product the molecular ratio of the phenylene group present (regardless of its substituents) to X is 2:1 to 5:4.

It is known that certain substituted phenylenediamines act as antiozone agents when mixed with a rubber composition. The advantages of the compounds of the present invention over the parent substituted phenylenediamine compounds from which they are derived are: decreased volatility; lack of toxicity; less tendency to bloom from the stock; and much longer protection of the rubber products, as shown by actual service tests.

The phenylenediamines used in making the condensation products are represented by the general formula NHR.C$_6$H$_4$.NHR' in which R is from the class consisting of phenyl, alkylphenyl in which the alkyl group or groups contain 1 to 6 carbon atoms, cycloalkyl radicals of 5 to 7 carbon atoms including cyclopentyl, methyl cyclopentyl, cyclohexyl, methylcyclohexyl, and alkyl groups of 1 to 10 carbon atoms, such as methyl, ethyl, n-propyl, isopropyl, sec-butyl, n-butyl, t-butyl, n-amyl, sec-amyl, t-amyl, n-hexyl, sec-hexyl, t-hexyl, n-heptyl, t-heptyl, sec-heptyl, n-octyl, tt-octyl, sec-octyl, n-nonyl, sec-nonyl, t-nonyl, n-decyl, sec-decyl and t-decyl. R' is an alkyl group of 1 to 10 carbon atoms or a cycloalkyl group of 5 to 7 carbon atoms. The substituent groups can be the same or different. The following compounds are illustrative:

N,N'-dimethyl o- and p-phenylenediamines
N,N'-diethyl o- and p-phenylenediamines
N,N'-di-isopropyl o- and p-phenylenediamines
N,N'-di-sec-butyl o- and p-phenylenediamines
N,N'-di-sec-octyl o- and p-phenylenediamines
N,N'-dicyclohexyl o- and p-phenylenediamines
N-methyl, N'-ethyl o- and p-phenylenediamines
N-ethyl, N'-t-butyl o- and p-phenylenediamines
N-methyl, N'-cyclohexyl o- and p-phenylenediamines
N-tt-octyl, N'-cyclopentyl o- and p-phenylenediamines
N-t-butyl, N'-(o-t-butyl-p-ethyl) phenyl o- and p-phenylenediamines
N-sec-octyl, N'-alpha methyl-(p-methyl) benzyl o- and p-phenylenediamines
N-cyclohexyl, N'-alpha-methylbenzyl o- and p-phenylenediamines
N-isopropyl, N'-benzyl o- and p-phenylenediamines
N-methyl, N'-tolyl o- and p-phenylenediamines
N-cyclohexyl, N'-phenyl o- and p-phenylenediamines
N-isopropyl, N'-phenyl o- and p-phenylenediamines
N-sec-octyl, N'-phenyl o- and p-phenylenediamines
N-methyl, N'-ethylphenyl o- and p-phenylenediamines The following are illustrative of the dihalogenated reactants used in making the reaction products:

Ethylene dichloride, dibromide and diiodide
1-chloro-2-bromoethane
Propylene dichloride, dibromide and diiodide
Trimethylene dichloride, dibromide and bromoiodide
Butylene dichloride, dibromide and diiodide
Tetramethylene dichloride, dibromide and diiodide
Pentylene dichloride, dibromide and diiodide
Hexamethylene dichloride, dibromide and diiodide
Hexylene dichloride, dibromide and diiodide
Octylene dichloride, dibromide and diioide
Pentamethylene dichloride, dibromide and diiodide
Alpha,beta-styrene dichloride, dibromide and diiodide
1,2-dibromocyclohexane
1,3-dibromobutane
1,2-dibromobutane
1,4-dichlorobutene-2
2-phenyl-1,2-dibromopropane
1-p-tolyl-1,2-dichloroethane
1-(2,4-dichlorophenyl)-1,2-dichloroethane
1-(p-chlorophenyl)-1,2-dibromoethane
Decamethylene dichloride, dibromide and diiodide
Dodecamethylene dichloride, dibromide and diiodide
1,2-dibromobutene-3
1,2-dichloropentene-4
1,2-dichloro-3-methylbutene-3
1,4-dichlorobutene-2
1,4-dibromo-2,3-dimethylbutene-2
1,2-dichlorocyclopentene-3
1,4-dibromocyclopentene-2
1,4-dibromo-2,6-dimethylheptene-2
2,3-dichloro-2,6-dimethyloctene-6

One of the preferred phenylenediamines is N,N'-di-sec-butyl-p-phenylenediamine which is well known to be a severely toxic and sensitizing agent. This is preferably reacted with ethylene dichloride or ethylene dibromide. Both halogens are replaced during the reaction, and the hydrogen halide produced is neutralized by any alkaline neutralizing agent ordinarily employed for neutralizing hydrogen halide produced in condensation reactions, such as sodium, potassium, or ammonium hydroxide, carbonate, bicarbonate, phosphate and the like. The condensation reaction can be carried out at any temperature between room temperature and the refluxing temperature of the aqueous reaction mixture, at atmospheric, subatmospheric or superatmospheric pressure. Compounds or mixtures of compounds of different molecular weights are obtained. Thus the condensation product may contain two to five or more phenylenediamine nuclei.

The following reactions are illustrative:

REACTION NO. 1

Four hundred forty grams (2 moles) of N,N'-di-sec-butyl-p-phenylenediamine, 106 grams (1 mole) of anhydrous sodium carbonate in one liter of water, and 188 grams (1 mole) of ethylene dibromide were heated at reflux for 7½ hours. The aqueous layer was separated from the cooled reaction mixture and discarded. The organic layer was taken up in ether, the ether solution was washed twice with water, treated with decolorizing carbon, and filtered. Evaporation of the ether on the steam bath, followed by heating the residue to 140° C. on a hot plate, gave a crude product weighing 414 grams. It was dark brown in color and is identified herein as Product A.

Distillation of 70 grams of Product A at 1 mm. pressure gave the following fractions, to several of which reference is made below, and these are identified by product designations.

| Fraction | Boiling point | Grams | Percent | Designation |
|---|---|---|---|---|
| I | 130 to 140° C | 8.7 | 12.4 | |
| II | 140 to 165° C | 4.1 | 5.9 | |
| III | 165 to 245° C | 4.5 | 6.4 | Product B. |
| IV | 245 to 265° C | 25.3 | 35.7 | Product C. |
| V | Residue | 20.0 | 28.2 | Product D. |

On standing the crude condensation product crystallized. On extraction with petroleum ether, 50 grams of crude product gave 11.5 grams (23 percent yield) of crude solid. After extraction with methanol this product was recrystallized from isopropyl alcohol and then from n-hexane, to yield a product having a constant melting point of 109 to 113° C. This product is designated as Product E herein.

Crystalline Product E was analyzed to determine its structure. The data obtained is given in the following table and is there compared with the theoretical for the condensation product of four moles of the phenylenediamine with three moles of the dihalide:

| | Ratio 4:3, percent | Found, percent |
|---|---|---|
| Carbon | 77.62 | 77.54 |
| Hydrogen | 10.72 | 10.70 |
| Nitrogen | 11.68 | 11.85 |
| Molecular weight (cryoscopic) | 959.4 | 1034. |
| Active hydrogen | 0.21 | 0.19 |

The good agreement between the calculated percentage composition and the actual analysis is apparent. Because of this good agreement, it is concluded that this crystalline Product E has the following structure:

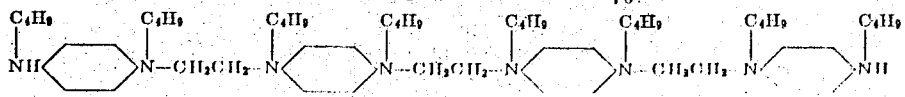

where $C_4H_9$ is a secondary butyl group.

REACTION NO. 2

The above reaction was repeated, using 330 grams (1.5 moles) of N,N'-di-sec-butyl-p-phenylenediamine, 79.5 grams (1.75 moles) of sodium carbonate in 750 ml. of water, and 141 grams (0.75 mole) of ethylene dibromide, to give 340 grams of crude product. Seventy grams of this material was distilled under reduced pressure until the unreacted material was removed (up to 140° C. at 1 mm.). The distilled material weighed 20 grams (28.5 percent). The residue (50 grams) was a dark brown viscous liquid and was designated Product F.

REACTION NO. 3

In the foregoing reactions the phenylenediamine and ethylene dibromide were reacted in the ratio of 2:1. In this third reaction an excess of 45 percent of ethylene dibromide over that required for the 2:1 ratio was employed.

Four hundred forty grams (2 moles) of N,N'-di-sec-butyl-phenylenediamine and 154 grams (1.45 moles) of sodium carbonate in 1 liter of water were heated to reflux and then 273 grams (1.45 moles) of ethylene dibromide was added over an hour period. The reaction mixture was refluxed 5 hours. The aqueous layer was removed by decantation and the non-aqueous layer was treated with 200 ml. of petroleum ether, 1 liter of methanol and 500 ml. of isopropanol. It was allowed to stand one day to crystallize. It was filtered, the crude crystalline material weighing 200 grams. This crude product was dissolved in toluene and precipitated by alcohol. It was then recrystallized from n-hexane-n-heptane mixture. The purified product weighed 80 grams and melted at 115–118° C. A portion, further purified by recrystallization from hexane-methanol for analysis, had a melting point of 117–122° C. and herein is designated as Product G.

In the following table we compare the analysis of Product G with the analysis calculated for the compound containing 4 phenylenediamine nuclei to 3 ethylene bridges:

| | Calculated, percent | Found, percent |
|---|---|---|
| Carbon | 77.62 | 77.33 |
| Hydrogen | 10.72 | 10.53 |
| Nitrogen | 11.68 | 12.09 |
| Molecular weight | 959.4 | 1010. |
| Active hydrogen | 0.21 | 0.20 |

This analysis of Product G indicates that it has the same structure as Product E, the higher melting point probably being caused by a slightly higher degree of purity.

N,N'-di-sec-butyl-phenylenediamine was reacted with ethylene dibromide using various excess percentages of the latter, employing the general reaction as set forth in more detail in the foregoing. In each case the reaction mixture was refluxed for 6 hours. The following table gives the yield in each instance and a description of the product. The percent of crystalline solid in the product was determined by extraction with petroleum ether. The yield and melting point of the fourth condensation product in this table were determined after recrystallization from toluene-methanol and n-hexane-n-heptane. This product will be recognized as Product G of Reaction No. 3.

Table 1

| Reactants | | | | | | Yield in grams | Percent solid [1] | Description | Product |
|---|---|---|---|---|---|---|---|---|---|
| N,N'-di-secbutyl-p-phenylenediamine | | Na₂CO₃ (in 100 ml. water) | | Ethylene di-bromide | | | | | |
| Grams | Mole | Grams | Mole | Grams | Mole | | | | |
| 44.0 | 0.2 | 12.2 | 0.115 | 21.2 | 0.115 | 40.5 | 20 | Dark brown semi-solid. | H |
| 44.0 | 0.2 | 13.8 | 0.130 | 24.4 | 0.130 | 42.5 | | Dark brown, very sticky. | I |
| 44.0 | 0.2 | 15.4 | 0.145 | 27.3 | 0.145 | 46.0 | 40 | Dark red-brown semi-solid. | J |
| 440 | 2.0 | 154 | [2] 1.45 | 273 | 1.45 | 80 | | Light reddish purple solid. | G |
| 44.0 | 0.2 | 16.5 | 0.155 | 29.2 | 0.155 | 44.7 | | Brown, plastic solid. | K |
| 44.0 | 0.2 | 18.6 | 0.175 | 32.9 | 0.175 | 44.5 | 48 | Brown, plastic. | L |

[1] Percent crystalline solid in product obtained.
[2] In 1 liter of water.

Condensation products with ethylene dichloride are readily obtained, but require more drastic conditions than those used for dibromide, as illustrated by the following reactions.

REACTION NO. 4

A pressure autoclave equipped with an external jacket having an electrical heater and provided with rocking mechanism to permit agitation was charged with 154 grams (0.7 mole) of N,N'-di-sec-butyl-p-phenylenediamine, 54 grams (0.545 mole) ethylene dichloride, 58 grams of sodium carbonate, and 350 ml. of water. Heating was carried on for 12½ hours at 260° F. After cooling, the gas formed during the reaction was released, and the product was dissolved in a mixture of 250 ml. of heptane and 100 ml. of toluene. The aqueous layer was separated and discarded, and the organic layer was washed once with dilute ammonia and twice with water. The solvent was removed and the residue was distilled up to 170° C. at 8 mm. to remove unreacted N,N'-di-sec-butyl-p-phenylenediamine. The viscous liquid thus obtained is designated Product M. This product was found to have a molecular weight (cryoscopic) of 444.

Other condensation products were obtained by using different mole ratios of N,N'-di-sec-butyl-p-phenylenediamine to ethylene chloride and different reaction conditions. Several such reactions are summarized in the following table. In this table the "Mole Ratio" is that of N,N'-di-sec-butyl-p-phenylenediamine to ethylene chloride charged.

| Product | Mole Ratio | Temperature °F. | Time hrs. | Molecular weight of product |
|---|---|---|---|---|
| N | 1:1.58 | 270 | 12 | 515 |
| O | 1:2.0 | 270 | 12 | 519 |
| P | 1:0.78 | 270 | 6 | *269 |
| R | 1:2.0 | 290–300 | 8½ | 438 |

*Unreacted amine not removed.

The larger amounts of ethylene dichloride required, compared to ethylene dibromide, to give a product of a certain molecular weight, is undoubtedly caused by side reactions.

REACTION NO. 5

A mixture of 44.0 grams (0.2 mole) of N,N'-di-sec-butyl-p-phenylenediamine, 15.9 grams (0.15 mole) of sodium carbonate in 200 ml. of water, and 3.3 grams (0.15 mole) of propylene dibromide was heated under reflux for 5 hours. The organic layer was separated from the aqueous layer in a separatory funnel. The unreacted N,N'-di-sec-butyl-p-phenylenediamine was removed by distillation, leaving a dark-brown very viscous liquid. This liquid is designated Product T.

REACTION NO. 6

One-tenth mole of p-ethylaminoaniline was dissolved in 100 ml. ethanol in 10 ml. of glacial acetic acid, 0.1 gram of platinum oxide and 0.2 gram of methyl-i-butyl ketone. Under 3–4 atmospheres of hydrogen two hours were required for absorption of 80 percent of the theoretical amount of hydrogen. The N-ethyl-N'-hexyl-p-phenylenediamine produced was worked up in the usual way and finally distilled. B.P. (3 mm.) 104–105° C.

Two-tenths mole of N-ethyl-N'-hexyl-p-phenylenediamine with 0.155 mole of ethylene dibromide and 0.155 mole of sodium carbonate in 100 ml. of water were heated and stirred under reflux for 6 hours. After extracting with toluene and washing with water the solvent and low-boiling material were taken off in vacuo, the final pot temperature being 155° C. under 3 mm. of nitrogen. Two determinations of the molecular weight (cryoscopic) of the resulting reaction product of the N-ethyl-N'-hexyl-p-phenylenediamine and ethylene dibromide gave 601 and 607. This product is identified herein as Product U.

REACTION NO. 7 n-Butylaminoaniline was alkylated with cyclohexanone under the conditions set forth for alkylation of p-ethylaminoaniline (above). The theoretical absorption of hydrogen occurred in 20 minutes to produce N-n-butyl-N'-cyclohexyl-p-phenylenediamine. B.P. (3 mm.) 164–166° C.

The condensation product of N-n-butyl-N'-cyclohexyl-p-phenylenediamine and ethylene dibromide was prepared in the same manner as in Reaction No. 6, except that 0.166 mole each of ethylene dibromide and sodium carbonate were used. The molecular weight (cryoscopic) of the product was 1150. This product is identified herein as Product V.

Products U and V showed antiozonant activity.

Various of the phenylenediamine derivatives are known to be toxic and to sensitize the skin. This is particularly true of N,N'-di-sec-butyl-para-phenylenediamine which is preferred as a starting material herein; the reaction products prepared from its are non-toxic and non-sensitizing, or substantially so.

The inhibiting effect of the condensation products of this invention on the action of ozone on rubbers was determined with ½ inch dumbbell strips of approximately 0.100 gauge thickness. These were exposed to ozone, the apparatus and method of determining the ozone consumption being described in the articles by Ford and Cooper appearing in India Rubber World 124, 696 (September 1951), and 125, 55 (October 1951), entitled A Study of the Factors Affecting the Weathering of Rubber-Like Materials, I and II. In the tests the ozone concentration was maintained at 60 parts per 100,000,000 parts of air, as indicated. Two types of tests were conducted. In one type called the dynamic test, the sample was repeatedly stretched between the limits of 0 and 20 percent elongation at the rate of 108 cycles per minute. In the other type of test, the static, the samples were maintained stretched at 12.5 percent elongation. Usually the samples were exposed for seven hours at 95° F., although the duration of several of the tests was changed, as indicated in the tables. On completion of the test the size and number of the cracks in each sample were compared visually with the size and number of the cracks in a blank which contained no antiozone agent and was tested at the same time as the test sample and under identical conditions.

An arbitrary scale of measuring the results was adopted. The size of the cracks was rated as very fine, fine, medium, coarse, or very coarse; and the number of the cracks was rated as none, very few, few, moderate, moderate to numerous (mod-to-num) or numerous (num).

Rubber compositions containing the condensation products were tested for physical properties as well as for their antiozone activity, with results recorded in the following tables:

The blank for the physical tests and tests for antiozone activity in GR–S (also known as SBR) tread stock was compounded according to the following formula:

| | Parts by weight |
|---|---|
| GR–S | 100 |
| Channel black | 45 |
| Zinc oxide | 2.4 |
| Oil softeners | 6.6 |
| Stearic acid | 2.5 |
| Sulfur | 1.7 |
| Accelerator | 1.2 |

The various antiozone agents were added to this formula using 2 parts by weight for each 100 parts by weight of GR–S. The rubber compositions were mixed in the usual manner, and slabs were cured or vulcanized in the usual manner. Test data obtained on strips cut from the vulcanized slabs are recorded in the following tables.

In the following tables "Tensile" is used for tensile strength, "T.S. Reten." for tensile strength retention, and "E. Reten." for elongation retention. The tensile strength retention and elongation retention are expressed as percentages, as is the elongation. The modulus and tensile strength are given in pounds per square inch.

*Table 2*

| | Blank | Sample 1 | Sample 2 | Sample 3 | Sample 4 |
|---|---|---|---|---|---|
| Blank | 159.4 | 159.4 | 159.4 | 159.4 | 159.4 |
| Product B | | 2 | | | |
| Product C | | | 2 | | |
| Product D | | | | 2 | |
| Product E | | | | | 2 |
| | 159.4 | 161.4 | 161.4 | 161.4 | 161.4 |
| (CURED 80' AT 280° F.) | | | | | |
| Normal tensile properties: | | | | | |
| 300% modulus | 850 | 775 | 725 | 725 | 750 |
| Tensile | 3,250 | 3,350 | 3,300 | 3,400 | 3,225 |
| Elongation | 600 | 625 | 655 | 660 | 655 |
| Aged 2 days in oven at 212° F.: | | | | | |
| 300% modulus | 2,000 | 1,650 | 1,550 | 1,625 | 1,525 |
| Tensile | 2,350 | 2,825 | 2,900 | 2,850 | 2,975 |
| T.S. Reten | 72 | 84 | 88 | 84 | 92 |
| Elongation | 335 | 415 | 440 | 420 | 450 |
| E. Reten | 56 | 68 | 67 | 64 | 69 |
| Ozone exposure: | | | | | |
| 4 hrs., 60 p.p.h.m., 95° F.— | | | | | |
| Static, size | Fine | | | | |
| Frequency | Num | None | None | None | None |
| Dynamic, size | Fine | | | | |
| Frequency | Num | None | None | None | None |
| 7 hrs., 60 p.p.h.m., 95° F.— | | | | | |
| Static, size | Coarse | | | | |
| Frequency | (¹) | None | None | None | None |
| Dynamic, size | Coarse | | | | |
| Frequency | (¹) | None | None | None | None |

¹ Mod-to-num.

The results show that the condensation products of N,N'-di-sec-butyl-p-phenylenediamine provide excellent protection.

Further test results are given in the following tables.

*Table 3*

| | Blank | Sample 5 | Sample 6 | Sample 7 | Sample 8 |
|---|---|---|---|---|---|
| Blank | 159.4 | 159.4 | 159.4 | 159.4 | 159.4 |
| Product A | | 2 | | | |
| Product H | | | 2 | | |
| Product I | | | | 2 | |
| Product J | | | | | 2 |
| | 159.4 | 161.4 | 161.4 | 161.4 | 161.4 |
| CURED 80' AT 280° F. | | | | | |
| Normal tensile properties: | | | | | |
| 300% modulus | 750 | 700 | 775 | 750 | 725 |
| Tensile | 3,250 | 3,550 | 3,450 | 3,500 | 3,400 |
| Elongation | 615 | 650 | 640 | 635 | 635 |
| Aged 2 days in oven at 212° F.: | | | | | |
| 300% Modulus | 1,875 | 1,625 | 1,600 | 1,600 | 1,600 |
| Tensile | 2,125 | 2,700 | 2,575 | 2,775 | 2,825 |
| T.S. Reten | 66 | 76 | 75 | 79 | 83 |
| Elongation | 345 | 425 | 410 | 450 | 455 |
| E. Reten | 56 | 65 | 64 | 71 | 72 |
| Ozone exposure: | | | | | |
| 3 hrs., 60 p.p.h.m. 95° F.— | | | | | |
| Static, size | Medium | | | | |
| Frequency | Num. | None | None | None | None |
| Dynamic, size | Medium | | | | |
| Frequency | Num. | None | None | None | None |
| 7 hrs., 60 p.p.h.m. 95° F.: | | | | | |
| Static, size | Coarse | | | | |
| Frequency | (¹) | None | None | None | None |
| Dynamic, size | Coarse | | | | |
| Frequency | Num. | None | None | None | None |

¹ Mod. to Num.

Table 4

|  | Blank | Sample 9 | Sample 10 | Sample 11 | Sample 12 |
|---|---|---|---|---|---|
| Blank | 159.4 | 159.4 | 159.4 | 159.4 | 159.4 |
| Product A |  | 2 |  |  |  |
| Product F (stripped by distillation) |  |  | 2 |  |  |
| Product K |  |  |  | 2 |  |
| Product L |  |  |  |  | 2 |
|  | 159.4 | 161.4 | 161.4 | 161.4 | 161.4 |
| CURED 80' AT 280° F. |  |  |  |  |  |
| Normal tensile properties: |  |  |  |  |  |
| 300% Modulus | 700 | 725 | 725 | 700 | 675 |
| Tensile | 3,150 | 3,525 | 3,550 | 3,475 | 3,500 |
| Elongation | 620 | 635 | 635 | 630 | 625 |
| Aged 2 days in oven at 212° F.: |  |  |  |  |  |
| 300% Modulus |  | 1,900 | 2,000 | 1,900 | 1,925 |
| Tensile | 1,925 | 2,700 | 2,750 | 2,875 | 2,625 |
| T.S. Reten | 61 | 77 | 77 | 80 | 75 |
| Elongation | 280 | 385 | 395 | 395 | 375 |
| E. Reten | 45 | 61 | 62 | 63 | 60 |
| Ozone exposure, 7 hrs. 60 p.p.h.m. 95° F.: |  |  |  |  |  |
| Static, size | Coarse |  |  |  |  |
| Frequency | Num. | None | None | None | None |
| Dynamic, size | Medium |  |  |  |  |
| Frequency | Num. | None | None | None | None |

Table 5

|  | Blank | Sample 13 | Sample 14 |
|---|---|---|---|
| Blank | 159.4 | 159.4 | 159.4 |
| Product T |  | 2 |  |
| Product G |  |  | 2 |
|  | 159.4 | 161.4 | 161.4 |
| CURED 80' AT 280° F. |  |  |  |
| Normal tensile properties: |  |  |  |
| 300% Modulus | 750 | 650 | 775 |
| Tensile | 2,800 | 3,350 | 3,575 |
| Elongation | 590 | 675 | 655 |
| Aged 2 days in oven at 212° F.— |  |  |  |
| 300 Modulus | 2,050 | 1,675 | 1,675 |
| Tensile | 2,550 | 2,950 | 3,225 |
| T.S. Reten | 91 | 88 | 90 |
| Elongation | 320 | 450 | 470 |
| E. Reten | 54 | 67 | 72 |
| Ozone exposure, 4 hrs. 60 p.p.h.m. 95° F.: |  |  |  |
| Static, size | Coarse |  |  |
| Frequency | Num. | None | None |
| Dynamic, size | Medium |  |  |
| Frequency | Num. | None | None |

Both condensation products gave excellent results.

Antiozone activity on one stock was determined by a static test, with the stock exposed to normal sunlight outside while elongated 12½ percent. The results are recorded in the following table:

|  | 28 days—July 29-August 26 | | | 2 months—July 29-September 28 | | |
|---|---|---|---|---|---|---|
|  | Front | Back | Edge | Front | Back | Edge |
| Blank | Coarse Numerous. | Coarse Numerous. | Coarse Numerous. | Coarse Numerous. | Coarse Numerous. | V. Coarse. Numerous. |
| Product A | None | None | None | None | None | None. |

The physical properties of Product C were compared with those of the parent material, N,N'-di-sec-butyl-p-phenylenediamine, in a black sidewall tire stock of the following formula:

|  | Parts by weight |
|---|---|
| GR-S | 88.5 |
| Elastomeric plasticizer | 22.9 |
| Carbon black | 42.0 |
| Zinc oxide | 3.0 |
| Oil softener | 10.0 |
| Antioxidant [1] | 1.6 |
| Sulfur | 2.0 |
| Accelerator | 1.0 |
| Paraffin wax | 3.0 |

[1] The antioxidant is a mixture of 2,2,4-trimethyl-6-phenyl-1,2-dihydroquinoline and N,N'-diphenyl-p-phenylenediamine.

Two parts of N,N'-di-sec-butyl-p-phenylenediamine and the respective test materials were added for testing.

These stocks were cured 60 minutes at 280° F. and found to have the following properties:

| Addition | None | Parent material | Product C |
|---|---|---|---|
| Normal tensile properties: |  |  |  |
| 300% modulus | 600 | 600 | 575. |
| Tensile | 1,700 | 1,500 | 1,600. |
| Elongation | 690 | 620 | 640. |
| Aged 2 days at 212° F.: |  |  |  |
| Tensile | 1,350 | 1,375 | 1,425. |
| Elongation | 330 | 320 | 320. |
| T.S. Reten | 79.5 | 91.5 | 88.5. |
| Ozone exposure, 7 hrs. 60 p.p.h.m. 280° F.: |  |  |  |
| Static, size | No cracking | No cracking | No cracking |
| Dynamic | Many cracks medium size. | Few edge cracks only. | Few edge cracks only. |
| Bloom (shelf aged 15 days) | None | Heavy Reddish Brown Bloom | Trace. |

These data show the reaction product of ethylene dibromide and N,N'-di-sec-butyl-p-phenylenediamine to give ozone protection fully equivalent to that given by the parent compound without the objectional bloom given by the latter.

Product O was evaluated in natural rubber tire tread stock of the following composition:

| | Parts by weight |
|---|---|
| Smoked sheets | 100 |
| Softener | 4 |
| Stearic acid | 3 |
| Zinc oxide | 3 |
| Accelerator | 1 |
| Sulfur | 3 |
| Carbon black | 50 |
| | 164 |

*Table 6*

| | Control | Wax control | Test |
|---|---|---|---|
| Blank | 164 | 164 | 164 |
| Wax | | 3 | 3 |
| Product O | | | 2 |
| | 164 | 167 | 169 |
| CURED 60′ AT 280° F. | | | |
| Normal tensile properties: | | | |
| 400% Modulus | 3,100 | 2,900 | 2,525. |
| Tensile strength | 3,975 | 3,850 | 3,950. |
| Elongation | 480 | 480 | 520. |
| Aged 2 days at 212° F.: | | | |
| Tensile strength | 1,775 | 1,625 | 2,025. |
| Elongation | 260 | 270 | 300. |
| Ozone exposure, 7 hrs. 60 p.p.h.m. 95° F.: | | | |
| Static, size | Fine | Medium | None. |
| Frequency | Numerous | Moderate | None. |
| Dynamic, size | Fine | Fine | V. Fine. |
| Frequency | Numerous | Numerous | Numerous. |
| Mixed ozone test, 10 hrs. 60 p.p.h.m., at 95° F.: | | | |
| Size | Medium | Medium | V. Fine. |
| Frequency | Numerous | Numerous | Numerous. |

The "Mixed Ozone Test" was conducted partially under static conditions and partially under dynamic conditions.

The results of the foregoing test show that in all the ozone cracking tests, a stock containing Product O plus 3 parts of wax is better than a blank stock containing no additive or such stock containing 3 parts of wax alone.

Although the test results refer to the use of the novel condensation products with natural rubber and GR-S, the invention includes the use of the antiozonants with any diene rubber, including homopolymers and copolymers of conjugated hydrocarbon dienes, copolymers of such conjugated dienes and ethylenically unsaturated monomers, and mixtures thereof, including butadiene-isoprene copolymers and rubber identified under ASTM designated D1418-56T in the 1956 Journal as NBR, ABR, PBR and SIR and especially natural rubber, BR, SBR, IR and IIR, etc.

Crosslinked, cured or vulcanized rubber is a rubber made less soluble, less thermoplastic and more elastic by crosslinking. Crosslinking or curing can be accomplished by any known crosslinking agent or method. A rubber can be cured by heating it with sulfur or a sulfur-bearing curing agent, preferably in the presence of a suitable accelerator, and this process is well known in the rubber art as sulfur vulcanization. Other curing agents such as selenium or tellurium can be used in conjunction with or replacing sulfur.

A different class of curing agents for rubbers includes the well known di- or poly-nitroso compounds, quinone oximes and derivatives thereof and quinone anils, di- and poly-nitro compounds, bis- and poly-azo compounds, diazoamino compounds, and various organic peroxides, including dicumyl peroxide, for example. The rubber is usually heated with the curing agents to effect the desired crosslinking, as is known in the art. This type of curing agent can be accelerated by lead oxides, for example red lead ($Pb_3O_4$), quinone dianils, certain substituted phenylenediamines, etc., as is known in the art.

Rubbers are cured also by heating admixed with a curable resin, such as a phenol-aldehyde resol or even the monomeric dimethylol- or polymethylol-phenol. The phenol is advantageously nuclearly substituted by a hydrocarbon radical. An example of this type of curing agent is the resol formed by condensing a molar excess of formaldehyde with p-tt-octylphenol in the presence of an alkaline catalyst.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur.

Known vulcanization accelerators are useful in speeding up the vulcanization process and operative herein, especially the relatively active accelerators including the thiazole sulfenamides, e.g., N-cyclohexyl-2-benzothiazole-sulfenamide, thiazoline sulfenamides, thiocarbamyl sulfenamides, mercaptothiazoles, mercaptothiazolines, thiazolyl mono- and di-sulfides, the N,N′-disubstituted dithiocarbamates, the thiuram sulfides, the xanthogen sulfides, and metallic salts of mercaptothiazoles or mercaptothiazolines or dithiocarbamic acids.

One or more accelerator activator is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization of a suitable activated rubber composition can take place at lower temperatures such as at ordinary room temperature. For example, a latex film containing a sulfur curing agent and an activated ultra accelerator can be cured by allowing the film to remain at room temperature for several hours or a few days.

The above data show that the phenylenediamine derivatives of the invention possess a number of unobvious advantages over the corresponding diamines. A small amount of the antiozone agent, between 0.005 and 10 parts by weight per 100 parts of the rubber, is effective. The agent is also effective, especially at the lower concentrations, as a heat and light stabilizer in synthetic rubbers, e.g., high cis-polyisoprene. The combination of a wax with a diamine derivative of the invention protects the various rubber compositions much more effectively against ozone than any of the materials employed in the prior art.

What I claim is:

1. A diene rubber composition which includes an antiozonant amount of an antiozonant selected from the class of antiozonants having the formulae

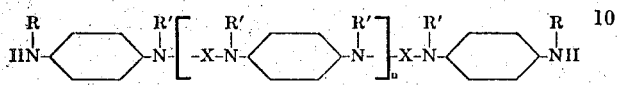

and

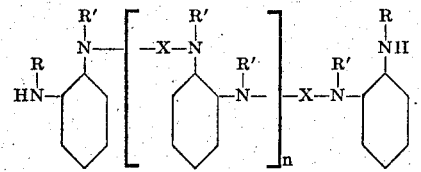

in which
X is a member from the class consisting of alkane groups containing two to twelve carbon atoms, cycloalkane groups containing five to ten carbon atoms, and phenyl-, alkylphenyl-, chlorophenyl- and dichlorophenyl alkane groups containing eight to twelve carbon atoms,
R is a member from the class consisting of phenyl, alkylphenyl radicals in which each alkyl group contains one to six carbon atoms, cycloalkyl radicals each containing five to seven carbon atoms and alkyl radicals each containing one to ten carbon atoms,
R' is a member from the class consisting of alkyl radicals containing one to ten carbon atoms and cycloalkyl radicals containing five to seven carbon atoms, and
$n$ is a number from the group consisting of 0, 1, 2 and 3, and is zero when R is of the class consisting of phenyl and alkylphenyl.

2. The composition of claim 1 in which the composition of the antiozonant is represented by the first of the two structural formulae there given.

3. The composition of claim 1 in which the composition of the antiozonant is represented by the second of the two structural formulae there given.

4. A diene rubber composition which includes an antiozonant amount of an antiozonant of the formula

in which
R is an alkyl group of one to ten carbon atoms, and
$n$ is a number from the group consisting of 0, 1, 2 and 3.

5. The composition of claim 4 in which each R is a sec-butyl group.

6. The process of vulcanizing a diene rubber which comprises vulcanizing the rubber when mixed with an antiozonant amount of an antiozonant which is selected from the class of antiozonants having the formulae

and

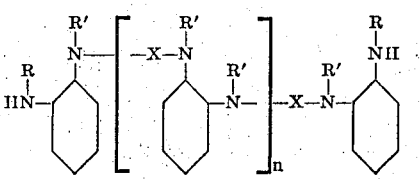

in which
X is a member from the class consisting of alkane groups containing two to twelve carbon atoms, cycloalkane groups containing five to ten carbon atoms, and phenyl-, alkylphenyl-, chlorophenyl- and dichlorophenyl alkane groups containing eight to twelve carbon atoms.
R is a member from the class consisting of phenyl, alkylphenyl radicals in which each alkyd group contains one to six carbon atoms, cycloalkyl radicals each containing five to seven carbon atoms and alkyl radicals each containing one to ten carbon atoms,
R' is a member from the class consisting of alkyl radicals containing one to ten carbon atoms and cycloalkyl radicals containing five to seven carbon atoms, and
$n$ is a number from the group consisting of 0, 1, 2 and 3, and is zero when R is of the class consisting of phenyl and alkylphenyl.

7. The process of claim 6 in which in the composition of the antiozonant is represented by the first of the two structural formulae there given.

8. The process of claim 6 in which in the composition of the antiozonant is represented by the second of the two structural formulae there given.

9. The process which comprises vulcanizing a diene rubber in the presence of an antiozonant amount of an antiozonant having the formula

in which
R is an alkyl group of one to ten carbon atoms, and
$n$ is a number from the group consisting of 0, 1, 2 and 3.

10. The process of claim 9 in which in the formula for the antiozonant each R is sec-butyl.

References Cited by the Examiner

UNITED STATES PATENTS

| | | | |
|---|---|---|---|
| 2,705,224 | 3/55 | Hill et al. | 260—45.9 |
| 2,072,596 | 3/57 | Jones | 260—809 |
| 2,939,867 | 6/60 | Ambelany | 260—45.9 |

FOREIGN PATENTS 483,605  4/38  Great Britain.

LEON J. BERCOVITZ, *Primary Examiner.*

UNITED STATES PATENT OFFICE

CERTIFICATE OF CORRECTION

Patent No. 3,208,967 September 28, 1965

Harry E. Albert

It is hereby certified that error appears in the above numbered patent requiring correction and that the said Letters Patent should read as corrected below.

In the heading to the printed specification, line 3, for "OF" read -- AS --; column 9, Table 5, first column, line 10 thereof, for "300" read -- 300% --; column 12, line 56, for "ethylxanate" read -- ethylxanthate --; column 14, line 21, for "alkyd" read -- alkyl --; line 70, for "Ambelany" read -- Ambelang --.

Signed and sealed this 25th day of April 1967.

(SEAL)
Attest:

ERNEST W. SWIDER
Attesting Officer

EDWARD J. BRENNER
Commissioner of Patents